US008447433B2

(12) United States Patent
Reynolds

(10) Patent No.: US 8,447,433 B2
(45) Date of Patent: May 21, 2013

(54) ELEVATOR DOOR WIRELESS CONTROLLER

(75) Inventor: Steven P. Reynolds, Toronto (CA)

(73) Assignee: The Peele Company Ltd., Ontario (CA)

( * ) Notice: Subject to any disclaimer, the term of this patent is extended or adjusted under 35 U.S.C. 154(b) by 669 days.

(21) Appl. No.: 12/563,489

(22) Filed: Sep. 21, 2009

(65) Prior Publication Data

US 2011/0071682 A1 Mar. 24, 2011

(51) Int. Cl.
*G05B 19/00* (2006.01)

(52) U.S. Cl.
USPC ............................ 700/275; 187/247; 187/317

(58) Field of Classification Search
USPC .................................. 700/275; 187/247, 317
See application file for complete search history.

(56) References Cited

U.S. PATENT DOCUMENTS

| | | | | |
|---|---|---|---|---|
| 2,300,953 | A | 11/1942 | McCormick | |
| 3,989,123 | A | 11/1976 | Rizzo et al. | |
| 4,709,788 | A | 12/1987 | Harada | |
| 4,979,593 | A | 12/1990 | Watanabe et al. | |
| 4,979,594 | A | 12/1990 | Begle et al. | |
| 5,002,158 | A | 3/1991 | Ericson et al. | |
| 5,012,899 | A | 5/1991 | Iwata | |
| 5,019,960 | A | 5/1991 | Ando et al. | |
| 5,274,203 | A * | 12/1993 | Skalski et al. | 187/393 |
| 5,636,714 | A | 6/1997 | Viola | |
| 5,712,458 | A | 1/1998 | McCandless et al. | |
| 5,732,795 | A | 3/1998 | McCarthy et al. | |
| 5,984,051 | A | 11/1999 | Morgan et al. | |
| 6,116,381 | A * | 9/2000 | Jalbert | 187/395 |
| 6,176,351 | B1 * | 1/2001 | Ikeda et al. | 187/387 |
| 6,269,911 | B1 | 8/2001 | Richter | |
| 6,315,083 | B1 | 11/2001 | Schuster et al. | |
| 6,321,877 | B2 | 11/2001 | Yamakawa | |
| 6,341,668 | B1 | 1/2002 | Fayette et al. | |
| 6,446,761 | B1 | 9/2002 | Motoyama et al. | |
| 6,467,585 | B1 | 10/2002 | Gozzo et al. | |
| 6,510,924 | B2 | 1/2003 | Bauer et al. | |
| 6,554,107 | B2 | 4/2003 | Yumura et al. | |
| 6,598,710 | B2 | 7/2003 | Motoyama et al. | |
| 6,601,679 | B2 | 8/2003 | Crenella et al. | |
| 6,801,792 | B1 | 10/2004 | Schuster et al. | |
| 6,976,561 | B2 | 12/2005 | Motoyama et al. | |
| 6,986,408 | B2 | 1/2006 | Takeuchi | |
| 7,040,457 | B1 | 5/2006 | Bene | |
| 7,077,244 | B2 | 7/2006 | Oh et al. | |
| 7,134,530 | B2 | 11/2006 | Motoyama et al. | |
| 7,325,657 | B2 | 2/2008 | Angst | |
| 7,426,981 | B2 * | 9/2008 | Bacellar et al. | 187/247 |
| 7,441,631 | B2 | 10/2008 | Oh et al. | |
| 7,479,861 | B2 | 1/2009 | Zepke et al. | |
| 7,493,991 | B2 * | 2/2009 | Oh et al. | 187/394 |
| 7,546,903 | B2 * | 6/2009 | Kattainen et al. | 187/316 |
| 2001/0022252 | A1 | 9/2001 | Schuster | |
| 2002/0014373 | A1 | 2/2002 | Lacarte Estallo | |
| 2003/0047390 | A1 | 3/2003 | Crenella et al. | |
| 2003/0159890 | A1 | 8/2003 | Schuster et al. | |
| 2003/0213654 | A1 | 11/2003 | Higuchi | |
| 2004/0039456 | A1 | 2/2004 | Davlin et al. | |
| 2004/0133719 | A1 | 7/2004 | Howard et al. | |
| 2004/0168863 | A1 | 9/2004 | Reynolds et al. | |
| 2004/0188184 | A1 * | 9/2004 | Kocher et al. | 187/302 |
| 2005/0103577 | A1 * | 5/2005 | Warner | 187/317 |
| 2005/0194217 | A1 * | 9/2005 | Smith et al. | 187/247 |
| 2006/0108181 | A1 * | 5/2006 | Bacellar et al. | 187/247 |
| 2007/0030832 | A1 | 2/2007 | Gonia et al. | |
| 2007/0125604 | A1 | 6/2007 | Ohira | |
| 2008/0091278 | A1 | 4/2008 | Reynolds | |
| 2008/0190704 | A1 | 8/2008 | Moses et al. | |
| 2009/0020370 | A1 * | 1/2009 | Boss et al. | 187/247 |

FOREIGN PATENT DOCUMENTS

| | | | |
|---|---|---|---|
| EP | 1 418 149 | A1 | 5/2004 |
| JP | 2002220168 | A | 8/2002 |
| WO | 2004/035449 | A1 | 4/2004 |

OTHER PUBLICATIONS

European Search Report dated Jul. 20, 2011 of corresponding Application No. EP 10 17 7561.

* cited by examiner

*Primary Examiner* — Mohammad Ali
*Assistant Examiner* — Anthony Whittington
(74) *Attorney, Agent, or Firm* — Pearne & Gordon LLP

(57) ABSTRACT

Control systems and methods for operating the doors of an elevator where the control logic is distributed in local car and landing door controllers that communicate wirelessly with one another to eliminate door control signal wiring in the hoistway thereby simplifying installation and diagnostics and affording door motor control that is individualized for each door.

25 Claims, 7 Drawing Sheets

ELEVATOR DOOR WIRELESS CONTROLLER

BACKGROUND OF THE INVENTION

The invention relates to elevator door operation and, in particular, to decentralized control for elevator doors.

PRIOR ART

Traditionally, power operated freight elevator doors have been controlled remotely from controls located in a machine room where automatic controls for the elevator car itself were located. Signals for indicating the status of the doors, i.e. open, closed, locked, and malfunctioned were transmitted in dedicated wires running between the machine room and the floors served by the elevator and to the elevator car. Traditional discreet signal wire arrangements are expensive to install because of the amount of labor involved, including time frequently devoted to locating and correcting connection faults and errors as well as the cost of materials including wire, conduit, and accessories. U.S. Patent Publication US-2008-0091278-A1 illustrates improvements over traditional control wiring in elevator installations by employing serial communication to greatly reduce the number of wires required to control the elevator doors along a hoistway.

At a particular site, the doors at different floors can vary in size and mass. These variations are not readily accounted for where it is desired to operate them with individual acceleration and speed profiles for smooth operation over an extended service life.

SUMMARY OF THE INVENTION

The invention provides systems and methods of their operation for improvements in automatic control of elevator doors, particularly freight elevator doors. In a disclosed preferred embodiment of the invention, the control is decentralized by providing a separate door controller at each landing as well as on the elevator car. Consequently, the door control takes no space in the machine room. The landing door controllers monitor conditions at the respective doors and communicate the monitored conditions wirelessly to each other and the car door controller. Further, in the disclosed embodiment, the landing door conditions, including the landing door user push button operating commands, are passed wirelessly between a landing door controller and the car door controller enabling the car door controller to relay door condition data with wire in the travel cable to the elevator control. Similarly, the car door controller can wirelessly instruct a landing door controller with opening and closing signals.

In the disclosed preferred embodiment, conditions at each landing door, including the identity of the floor, the presence of a stopped car indicated by a zone switch signal, and an emergency unlocking signal, are entered as a batch of data or "token" for wireless transmission to an adjacent landing and then succeeding landings. The token is passed wirelessly, i.e. by radio transmission, sequentially from one landing to the next adjacent landing up the hoistway and then down. When the token encounters the landing at which the car is stopped, the respective landing door controller wirelessly signals the car door controller of the landing door conditions at the landings through which the token passed and at its landing including its door position and door control push button signals. The car door controller, in turn, can relay certain of this information to the elevator controller by wire in the travel cable.

The disclosed systems and methods afford many benefits to the door installer, building owner/operator, and service personnel. Hoistway door control wires and the expense to install and troubleshoot them are eliminated. The door controllers, with plug and play attributes are interchangeable for use at any landing and on the car. The door controllers are each capable of self-learning the size of the door to which it is assigned and utilize closed loop variable voltage, variable frequency (VVVF) electronic drive of the associated door operating motors for custom acceleration and deceleration profiles for the door and its smooth trouble-free operation.

DESCRIPTION OF THE PREFERRED EMBODIMENT

Figure 1:
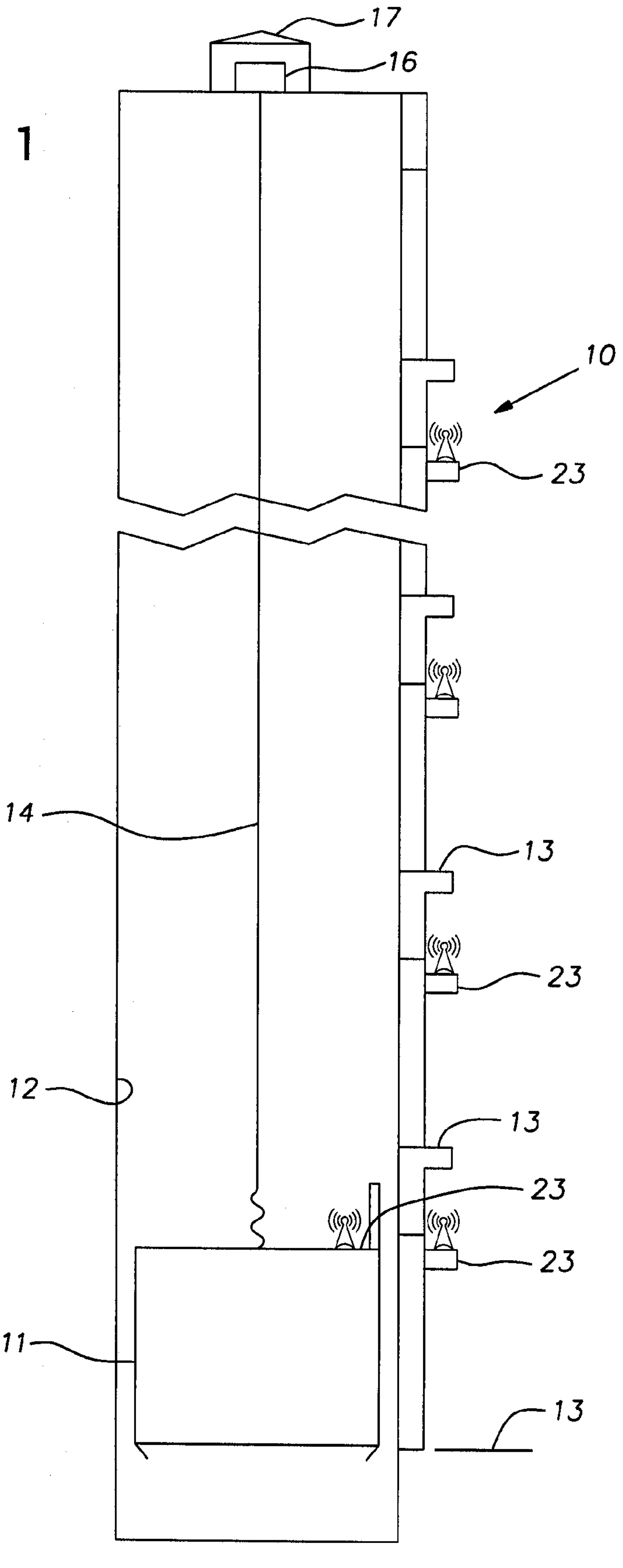
FIG. 1 is a schematic elevational view of a hoistway in which the invention is used.

Referring to the drawings and, in particular, FIG. 1, the invention is applied to a freight elevator installation 10 having an elevator car 11 operating in a hoistway 12 serving a plurality of landings 13 sometimes referred to as floors or halls. A travel cable 14, as is customary, connects electrical devices on the car to an elevator controller 16 in a machine room 17.

Figure 2:
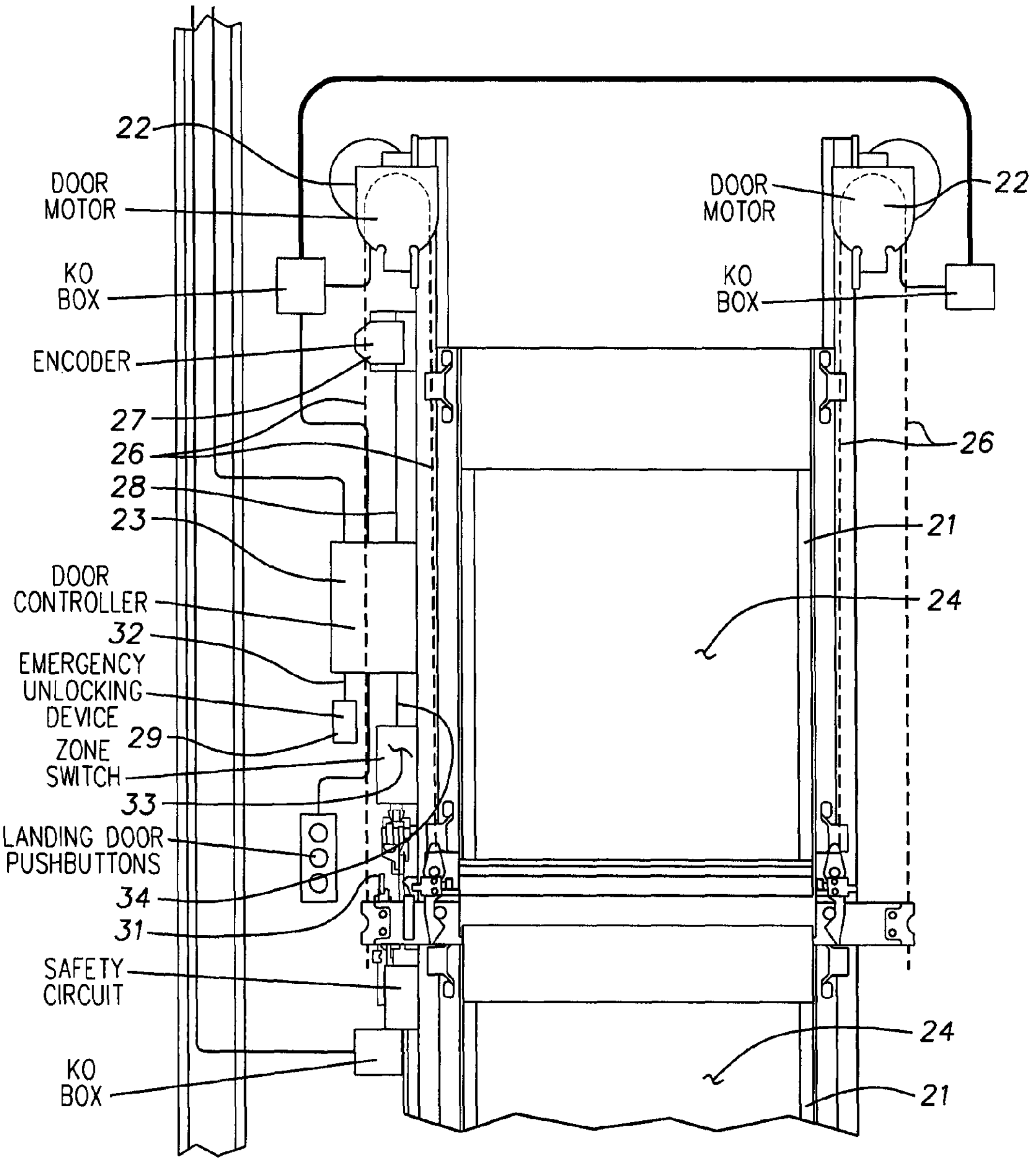
FIG. 2 is a schematic elevational view, from the car side, of a typical landing door control system.

At each landing 13, as depicted in FIG. 2, a vertical bi-parting door 21 is power operated by a pair of motors 22, preferably of conventional three phase design. A single motor can be used to operate a landing door where desired but may require a more complex door suspension. The motors 22 are powered through a door controller 23 and operate vertical bi-parting panels 24 of the door 21 through chains 26 in a known manner. A rotary encoder 27 monitors displacement of a chain 26 and therefore corresponding movement of the door panels 24 producing electrical pulses corresponding to increments of door movement. The encoder 27 is electrically connected to the controller 23 through wiring 28. An emergency unlocking device (EUD) 29, known in the art, for manually releasing a door lock 31 communicates a signal to the controller 23 through wiring 32. A zone switch or sensor 33, also known in the art, indicates through wiring 34 to the controller 23 the presence or absence of the car 11 stopped at the respective landing 13. As known in the art, the zone switch 33 located at a landing 13 is operated by a retiring cam, disclosed below, carried on the car 11. The zone switch 33 is operated when the door lock 31 is unlocked. The landing door system shown in FIG. 2 is duplicated at each landing 13 served by the elevator car 11, although the size (height) of the doors as well as their mass, can vary at a given installation from landing to landing.

Figure 3:
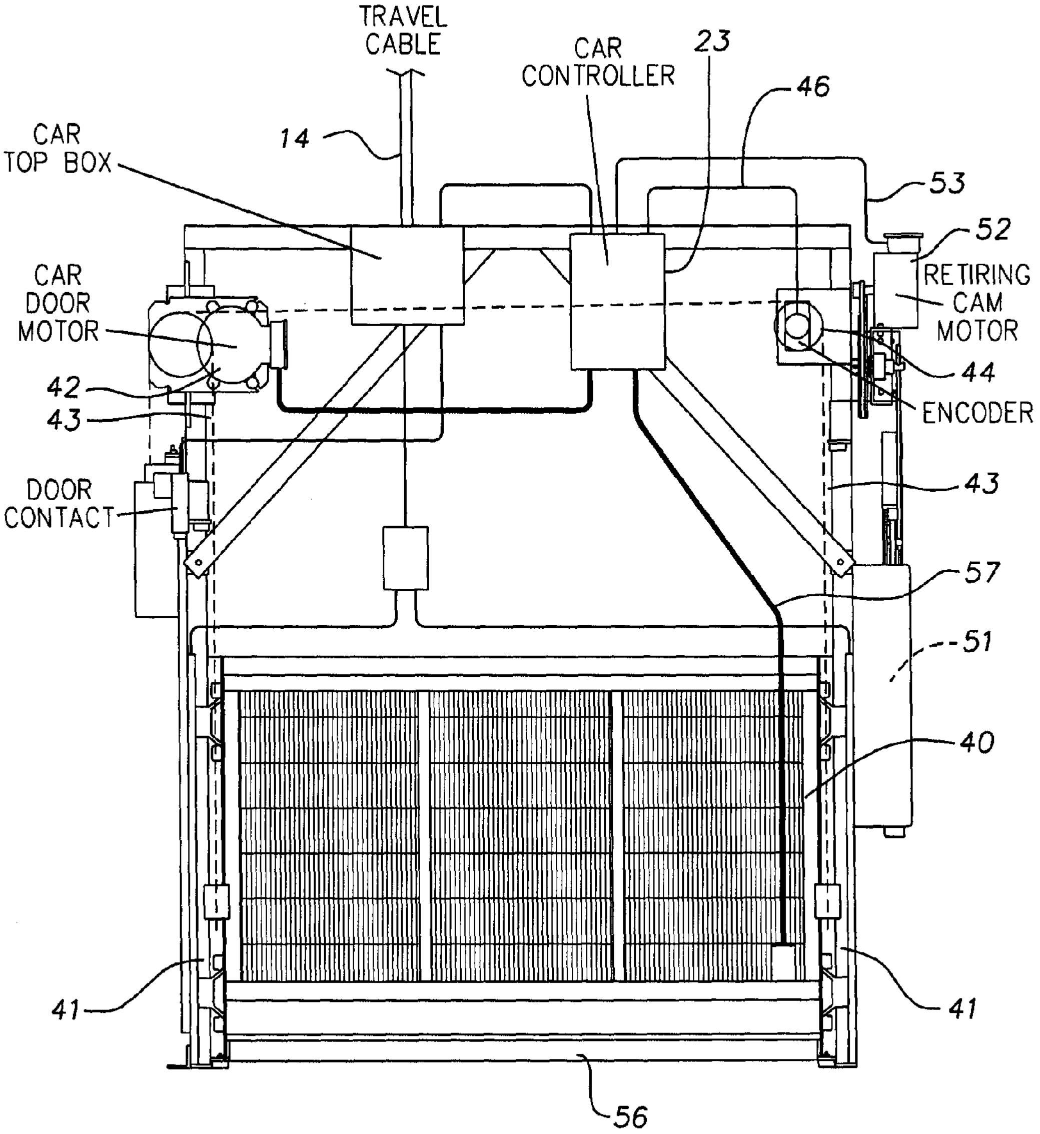
FIG. 3 is a schematic elevational view of a car door control system.

Referring to FIG. 3, a car door 40, often referred to as a gate, opens and closes vertically on rails 41 that are part of the car 11. Opening and closing movement of the car door 40 is produced by a car door motor 42, preferably a conventional three phase electrical unit. The motor 42, receiving electrical power from a door controller 23, lifts and lowers the car door 40 with a chain 43 as is customary. A rotary encoder 44 connected to the controller 23 through wiring 46 signals the movement of the car door 40 by sensing movement of the chain 43. Like the landing door encoder 27, for a known increment of motion of the door 40, the encoder 44 produces an electrical pulse thereby enabling the controller 23 to count pulses and know the speed and position of the door 40. A retiring cam 51 known in the art pivots into or out of a position where it unlocks a landing door lock 31. The retiring cam 51 is retracted or "retired" upon energization of an electric motor 52 preferably a three phase unit operated by the car controller 23 through wiring 53; in a customary manner, when the motor 52 is not electrically powered, the retiring cam 51 swings to an extended position where it unlocks the door lock 31 at the landing 13 hosting the car 11.

A reversing edge 56 of known construction operates as an electrical switch when it contacts an object in its path and electrically signals the car door controller 23 through wiring 57. As will be described below, the car door controller 23 communicates with the elevator controller 16 through wiring in the travel cable 14.

Figure 4:
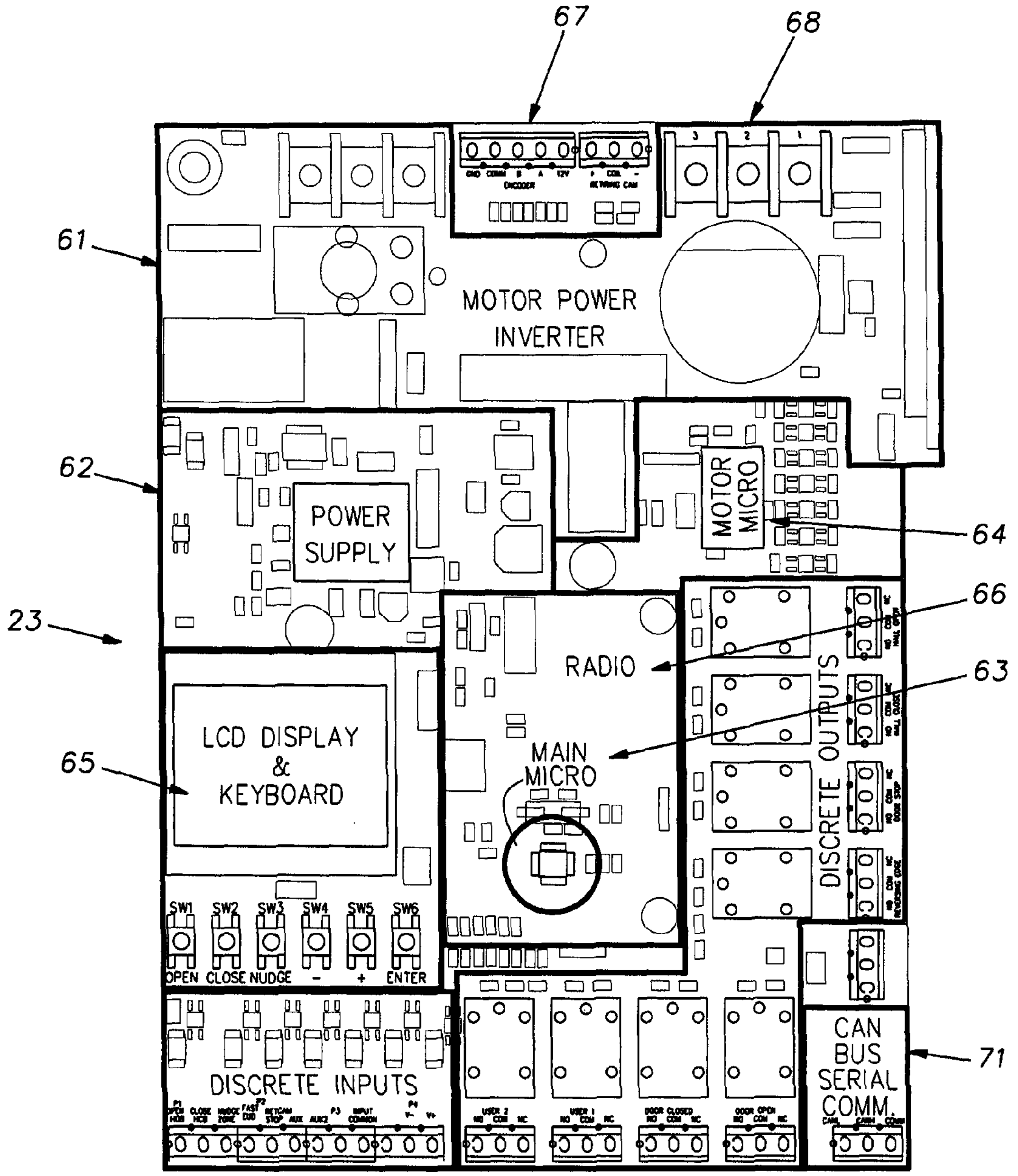
FIG. 4 is a schematic view of a door controller.
Figure 4A:
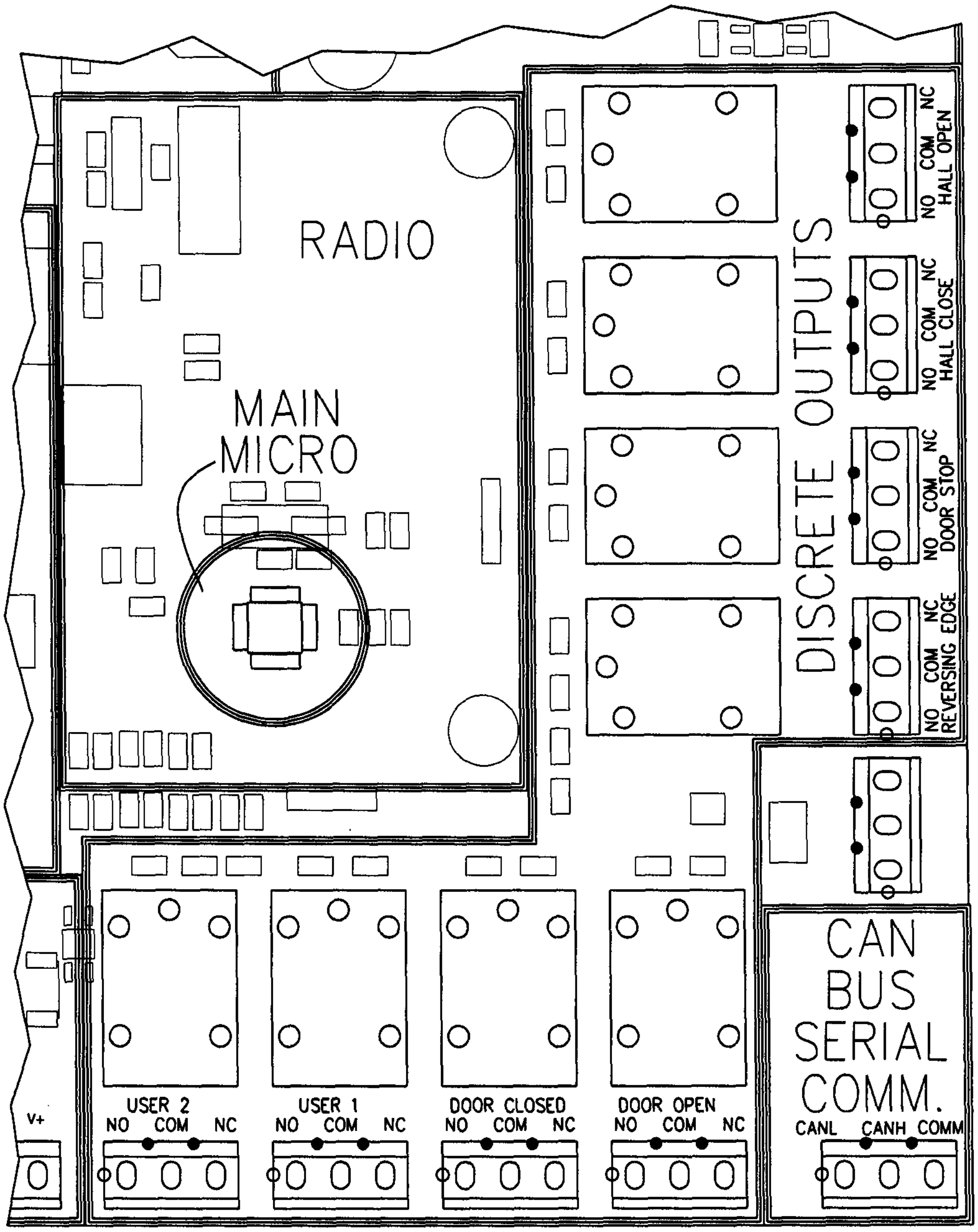
FIG. 4A is a fragmentary enlarged view of the output relays of the controller.

The landing door and car door controllers 23 can be the same or substantially the same in construction and operation so that one can be substituted for the other with little or no modification to obtain the desired door operation. FIG. 4 is a diagrammatic representation of the controller 23. The controller 23 includes a motor power inverter circuit and a three phase drive circuit 61 that convert regular utility power, for example 60 Hz single phase 208-240 VAC to three phase variable voltage variable frequency (VVVF) power in a known manner. The controller 23 also includes a power supply 62 for the electronics and other components within the controller. Still further, the controller 23 includes a main microprocessor 63 that performs door control logic, directs radio communication to the other controllers, responds to signal inputs, produces signal outputs and drives an interactive LCD screen display, discussed below. The controller 23, further, includes a motor drive microprocessor 64 that operates the car or landing doors, reads by counting the encoder signals to learn and register the size of a door opening, and establish the door opening movement profile. Still further, the controller 23 includes an LCD display and user keyboard section 65 used for set-up and adjustment of its respective door(s) by the mechanic and for trouble shooting and display of parameter settings for operating the door motor(s). Typical parameters for a particular door controller include:

door type—either car door or landing door;

channel—a unique number for the line of doors, i.e. front or rear and/or the particular hoistway in which the controller is used;

floor address—a unique address number for the landing opening to which the controller is assigned;

various other parameters involving, for example, speed, acceleration, deceleration of the door(s) which the controller operates.

It is expected that the controller 23 can be modified or simplified where desired such as by eliminating one or more features or by combining features such as using one microprocessor to serve the function of the main and motor drive microprocessors 63, 64. For purposes herein the term controller circuitry means one or both of the microprocessors 63, 64 or their electronic equivalent or equivalents.

Figure 5:
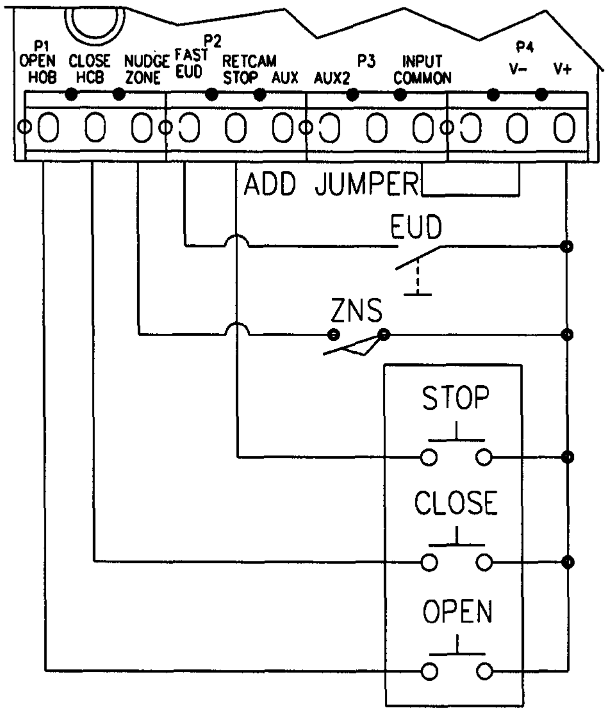
FIG. 5 is a fragmentary enlarged view of input connections of the controller for landing door service.

The illustrated controller 23 has a bank of five signal input terminals. When the controller 23 is used to operate a landing door, the inputs are assigned to the following door condition signals with the hall (landing) buttons, EUDs and zone switches working as sensors for the controller (see FIG. 5):

HOB, a hall open button input driven by a push button switch located at the controller's landing used to indicate that a user desires to open the door;

HCB, a hall closed button input driven by a push button switch located at the controller's landing used to indicate that a user desires to close the door;

STOP, a door stop button input driven by a push button switch located at the controller's landing used to indicate that a user desires to stop the door;

ZONE input for door zone, an input driven by the switch 33 located within the lock 31 of each landing door that makes up and tells the door controller that the elevator car is stopped at its assigned landing;

EUD input (emergency unlocking device), an input driven by a switch located in an emergency access box or EUD 29 actuated by the elevator personnel or firefighter used to indicate to the controller that the controller's landing door has been accessed.

Figure 6:
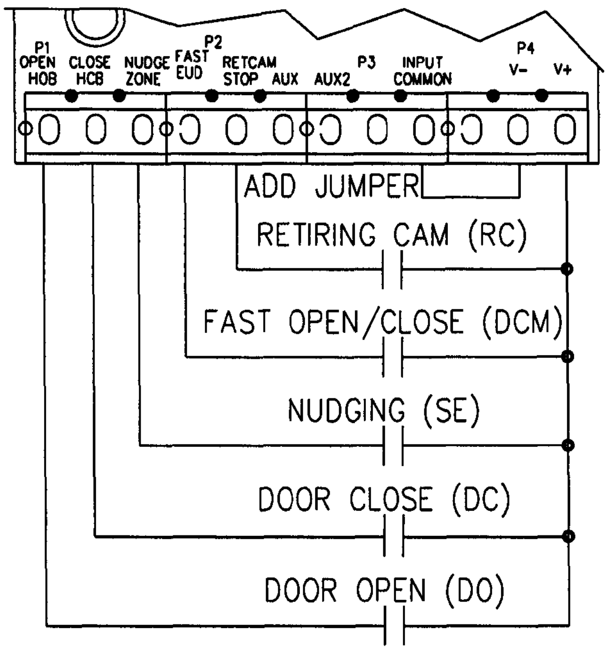
FIG. 6 is a fragmentary enlarged view of the input connections of the controller for car door service.

When the controller 23 is used on the car 11 to operate the car door 40, the inputs are assigned to the following signals from the elevator controller 16 (see FIG. 6):

OPEN input—a signal command from the elevator controller to open the doors;

CLOSE input—a signal command from the elevator controller to close the doors;

NUDGE input—a signal command from the elevator controller to close the car door slowly (nudging);

FAST input—a command from the elevator controller (used for firemen) to close the doors fast;

RETCAM—an input signal command from the elevator controller to lift the retiring cam 51 to lock the landing door which eventually allows the car to move.

From the foregoing, it will be seen that the controller 23 when it is assigned to the car 11 receives commands only from the elevator controller 16.

Figure 7:
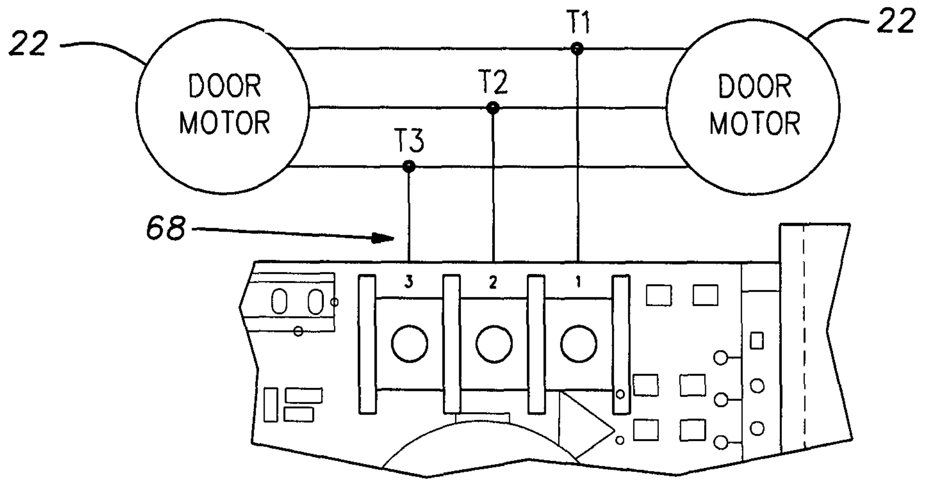
FIG. 7 is a fragmentary enlarged view of the controller showing connections to door motors at a landing.
Figure 8:
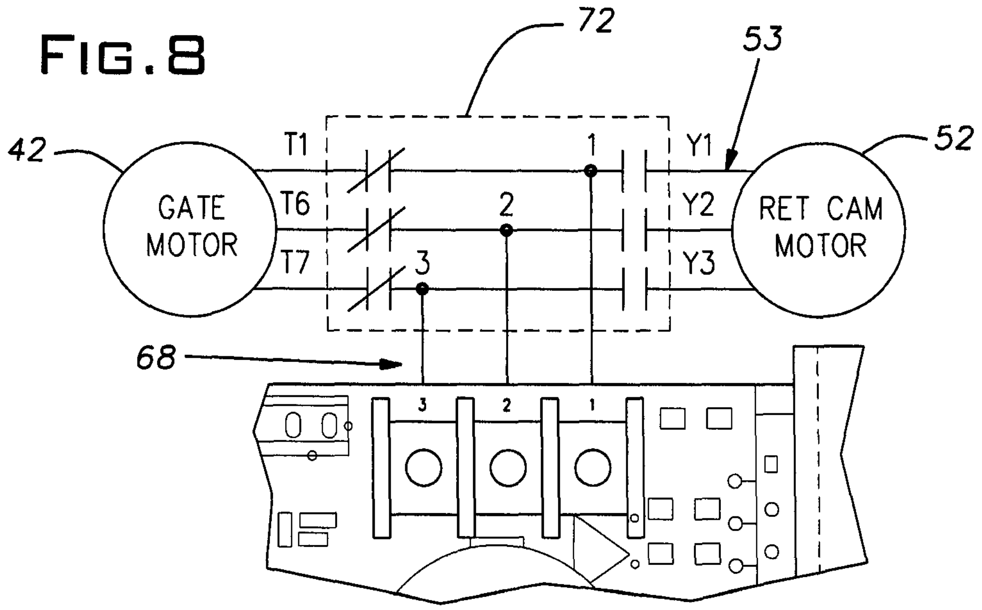
FIG. 8 is a fragmentary enlarged view of the controller showing connections to a car door motor and a retiring cam motor.

In both landing door and car door control service, the door controller 23 receives signals from respective encoders 27, 44 at a group of input terminals 67. In both service for the car or landing, the controller 23 determines the instantaneous and rest positions of its assigned door by the number of pulses transmitted from the associated encoder 44 or 27, e.g. starting at zero when closed and counting backward when closing. In either landing door control or car door control, as shown in FIGS. 7 and 8, the same set of connections 68 are used to power the respective door motors 22, 42 and retiring cam motor 52.

The door controller 23, referencing FIG. 4, has a bank of eight separate relay contact sets. When the controller 23 is serving as a car door controller, these relay outputs are available for communicating with the elevator controller 16 through wires in the travel cable 14. Alternatively, the door conditions which term includes hall button conditions reflected in these several relay contacts can be communicated through a set of output terminals 71 by, for example, serial communication using the CAN Open Lift profile. As shown in FIG. 4, the following relay outputs are provided:

DOOR CLOSED;

DOOR OPEN;

USER 1—a selectable relay output defaulted to indicate that the door is ¾ open;

USER 2—a selectable relay output defaulted to indicate that the door is ¾ closed;

HALL OPEN—relays a signal that the Hall Open Button (HOB) of the hall door is pressed;

HALL CLOSE—relays a signal that the Hall Close Button (HCB) of the landing is pressed;

DOOR STOP—relay output indicates that the doors have stopped unexpectedly or that the STOP button of the hall door is pressed;

REVERSING EDGE—relay output notifies the elevator controller that the contact type safety edge (shown in FIG. 3 at 56) on the car door 40 is activated by contacting an object in its path.

The door controller 23, additionally, includes a radio card 66 with RF transceiver circuitry and antenna enabling it to communicate by two-way radio signals, i.e. in a wireless manner, to the other nearby controllers. The main microprocessor of the door controller 23 directs the radio card to transmit the "token" data, by a suitable protocol using the IEEE 802.15.4 standard, to the next controller.

The door controller main microprocessor is programmed to suspend operation of the doors when a safety issue arises such as a multi-zone condition where two door zone switches 33 are activated at one time (since the elevator car can only be located at one floor) or when the emergency unlocking device EUD at any floor is activated. A multi-zone condition will be detected when the token passing technique of the controllers reveals that two zone switches are activated. This is accomplished by the token identifying the landing at which a zone switch is activated and maintaining this information as it sweeps up and down through the controllers of the hoistway. Whenever two landing addresses are associated with a zone switch activation, the door controller circuitry is programmed to discontinue door operation until the source of the error is cured. Similarly, the controller circuitry is programmed to discontinue door operation when ever a EUD signal is received at any of the landings. Still further, the controller circuitry is programmed to limit token passing to only between the landing door controller with the activated zone switch 33 and the car door controller for the brief period the car door and/or a landing door are in motion so that a delay however small, that might be involved with the time for the token to circulate through the landing controllers is avoided. This will avoid delaying a signal such as when the reversing edge signal arises.

In automatic freight elevator systems, the position and movement of the elevator car is determined by the elevator controller 16. Assuming the car 11 has just arrived at a landing 13, the elevator controller 16 tells the car controller 23 via a wire in the travel cable 14 to the RETCAM input to extend the retiring cam, which is done by removing power to the retiring cam motor 52 in the illustrated embodiment. The extended retiring cam 51 unlocks the landing door lock 31 at the host landing 13 and the zone switch 33, operated with the lock, signals the landing door controller 23 via a wire to the ZONE input that the car has arrived and the door has been unlocked. The landing door controller circuitry enabled by the ZONE input signal permits two way communication with the car door controller and causes a wireless signal transmission to the car door controller by way of passing the token to the car door controller. Controller circuitry is programmed so that landing door controllers not enabled by the presence of a ZONE signal cannot communicate directly by wireless transmission to the car door controller or receive wireless signals from the car door controller.

When a landing door controller has a ZONE input signal, its controller circuitry is programmed to add its landing door conditions to the token and to divert the supplemented token to the car door controller. The car door controller, under normal circumstances, has its controller circuitry programmed to return the token to the landing door controller for circulation up and down the hoistway. The supplemented token, in addition to the external signals existing at its inputs discussed above, signals the following landing door conditions:

Door Open Position, driven by the encoder positioning system after the opening has been learned;

Door Closed Position, driven by the encoder positioning system after the opening has been learned;

Other Door Positions, also driven by the encoder used for sequencing of the hall door and car door in the open and close cycle;

Door Stop, used to indicate that the door is jammed or otherwise unexpectedly stopped or blocked;

Various other program related functions including:

door ready indication, door active indication, address number, acknowledgements.

The door controller circuitry is programmed to "learn" its respective opening by initially counting the pulses from its encoder 27 or 44 during initial opening movement until the door stops against travel limits on its rails. The pulse count is stored in the memory of the controller circuitry for use in subsequent regular opening and closing cycles. Acceleration and deceleration profiles, during selective portions of total door movement can be programmed in the controller to take full advantage of the door travel length for both opening and closing.

The car door controller circuitry is programmed to initiate door opening when it receives a token from the landing door controller that the zone switch has been made and it has a door open command at the OPEN input from the elevator controller. The car door controller wirelessly signals the landing door controller to open its door 21. In response to this signal, the landing door controller supplies three phase (variable voltage variable frequency VVVF) power to its associated door motors 22. When the landing door controller determines that its door 21 is ⅔ open, by encoder pulse count, it wirelessly signals the car door controller; at this time the car door controller initiates opening of the car door by applying three phase (variable voltage variable frequency VVVF) power to its motor 42. Note that at this time, a retiring cam relay 72 (FIG. 8) has de-energized the retiring cam motor 52 and has connected the car door controller to the car door motor 42. The landing door controller wirelessly signals the car door controller that the landing door is fully open, as determined by encoder pulse count. Thereafter, when the car door is fully open, the car door controller signals the same to the elevator controller 16 via the DOOR OPEN relay output.

The elevator controller 16 initiates door closing movement with a travel cable wire signal to the car door controller CLOSE input. The car door controller begins door closing by powering the car door motor 42 in reverse; when the car door is ⅔ closed, the car door controller wirelessly signals the landing door controller to initiate landing door closing. When the landing door is fully closed, the landing door controller wirelessly signals the same to the car door controller. When both the car and landing doors have closed, the car door controller signals the elevator controller 16 via a travel cable line connected to the DOOR CLOSE relay output.

A travel cable wire signal to the car door controller RETCAM input from the elevator controller 16 through operation of the relay 72 and through the motor drive power causes the retiring cam to retire or retract resulting in the landing door at the host landing being locked in preparation for departure of the car.

The elevator system can continue operation under control of the elevator controller. If an unusual condition such as the presence of a multi-zone signal, an EUD signal or a DOOR STOP signal produced at the landing hosting the car occurs in the token, the car door controllers will suspend operation of the doors.

While the foregoing disclosure describes a freight elevator installation, the invention is applicable to passenger elevator installations, particularly where it is difficult to mechanically couple the car door(s) with the landing door(s) such as in high speed systems where close tolerances are problematic.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An elevator door control system for an elevator car operating in a hoistway serving a plurality of landings, the system including a door controller on the elevator car and at each landing, sensors at each landing that determine door conditions at each landing and communicate such conditions to an associated door controller, adjacent landing and car door controllers being in mutual communication, said door controllers, on the basis of information received from said sensors and communication between said door controllers, being configured to determine if door conditions at all of the landings are suitable to open or close the car and landing doors at a host landing in a manner free of assistance of a separate main door controller wired to the landing door controllers.

2. A door control system as set forth in claim 1, wherein said door controllers each provide electric power to an associated door motor.

3. A door control system as set forth in claim 2, wherein said door controllers each produce a variable voltage variable frequency source.

4. A door control system as set forth in claim 3, wherein said door controllers each produce three phase power from a single phase utility source.

5. A door control system as set forth in claim 2, wherein said door controllers have inputs responsive to the position of their associated door.

6. A door control system as set forth in claim 5, including a rotary encoder associated with each door and electrically wired to the associated door controller.

7. A door control system as set forth in claim 1, wherein each door controller has circuitry including an RF transceiver capable of communicating with the RF transceiver of the other door controllers in the system.

8. A door control system as set forth in claim 7, wherein each controller includes controller circuitry for operating the RF transceiver and the door associated with said controller.

9. A door control system as set forth in claim 8, wherein the RF transceiver and controller circuitry of the car controller is interchangeable with the RF transceiver and controller circuitry of the landing door controller.

10. A door control system as set forth in claim 9, wherein the controller circuitry of a controller controls the RF transceiver to transmit a token of data corresponding to the condition of the doors to a successive one of the landing door controllers.

11. A door control system as set forth in claim 1, wherein said door controllers all include inputs for receiving commands alternatively from an elevator controller or manually operated push buttons on a landing.

12. A door control system as set forth in claim 11, wherein all of said controllers have outputs to drive three phase door operating motors.

13. A door control system as set forth in claim 11, wherein said controllers each include inputs for receiving encoder pulses corresponding to increments of motion of a respective door.

14. A door control system as set forth in claim 13, wherein each of said door controllers includes controller circuitry with a program to store a pulse count corresponding to the travel of an associated door.

15. A door control system as set forth in claim 14, wherein each controller includes a RF transceiver, said controller circuitry being arranged to operate said RF transceiver and produce a token of data characterizing the conditions of the respective door and arranged to transmit such token to an adjacent landing door controller and the elevator car controller.

16. A door control system as set forth in claim 15, wherein the controller circuitry of a landing door controller is arranged to incorporate in the token conditions including the landing identity, the indicated presence of a car, and actuation of an emergency unlocking device (EUD).

17. A door control system as set forth in claim 16, wherein said controller circuitry is programmed to pass a token to the next landing door controller up the hoistway and then down the hoistway when reaching the uppermost landing served by the elevator car.

18. A door control system as set forth in claim 8, wherein the landing door controllers are responsive to actuation of a zone switch indicating the presence of a car at the associated landing and is conditioned by a signal from the zone switch to wirelessly communicate with the car door controller.

19. A door control system as set forth in claim 1, wherein the car door and landing door controllers have common inputs for door open and door close signals and for door position signals, and common outputs for door motor power.

20. A door control system as set forth in claim 19, wherein encoders are arranged to produce said door position signals.

21. A door control system as set forth in claim 20, wherein said car door and landing door controllers each include a radio card for wireless communication between said car door controller and said landing door controllers and among said landing door controllers.

22. A method of operating the doors of an elevator system comprising providing a door controller on the car and at each landing, each controller being provided with an RF transceiver for two-way wireless communication between adjacent landing door controllers, and between the car controller and an adjacent landing door controller, programming the landing door controllers to pass a token of data indicating door conditions and the identity of a landing door controller associated with a transmitting transceiver up and then down the hoistway, enabling a landing door controller to wirelessly communicate back and forth with the car door controller landing door conditions to the car door controller and landing door commands from the car door controller while communication of such conditions and commands back and forth between other landing door controllers and the car door controller is precluded, and wiring the car door controller to the elevator controller to signal landing door conditions to the elevator controller and receive door operating commands from the elevator controller.

23. A method as set forth in claim 22, wherein each of the door controllers monitor the position of its associated door with a motion encoder and produces variable voltage variable frequency power to its associated door motor or motors.

24. A method as set forth in claim 23, wherein the door position encoder information is used by the door controller to determine one or more of the open, closed and intermediate positions of an associated door.

25. An elevator door system comprising a separate door controller on an elevator car and at a plurality of landings along a hoistway and being served by the car, each controller having controller circuitry enabling the controller to be used either for car door control or landing door control, the controllers including a radio card for communication between landing door controllers and between landing door controllers and the car door controller, the door controllers each having inputs for receiving door position signals and outputs for driving electric door motors, the controllers each including inputs for door open and door close commands, the car door controller having door open and door close inputs wired to an elevator controller and the landing door controller having door open and door close inputs connected to associated landing door open and door closed push buttons, the landing door controllers being programmed to pass landing door condition data wirelessly up and down the hoistway, the landing door controllers each having an input for receiving a signal from an associated zone switch indicating the presence of the car stopped at an associated landing, each landing door controller only being enabled to wirelessly communicate with the car door controller when the associated zone switch indicates the presence of the car, the car door controller being wired to the elevator controller to relay landing door information received from an enabled landing door controller and being configured to wirelessly send door control commands to the enabled landing door controller.

* * * * *